Feb. 28, 1961
A. W. HANSON ET AL
2,973,487
WAVEGUIDE HYBRID STRUCTURE
Filed June 3, 1957
2 Sheets-Sheet 1
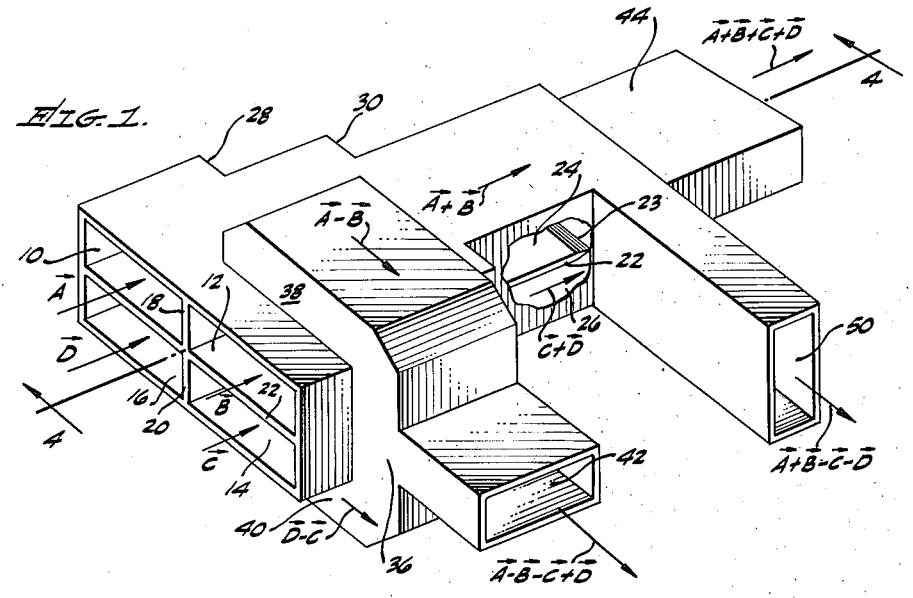
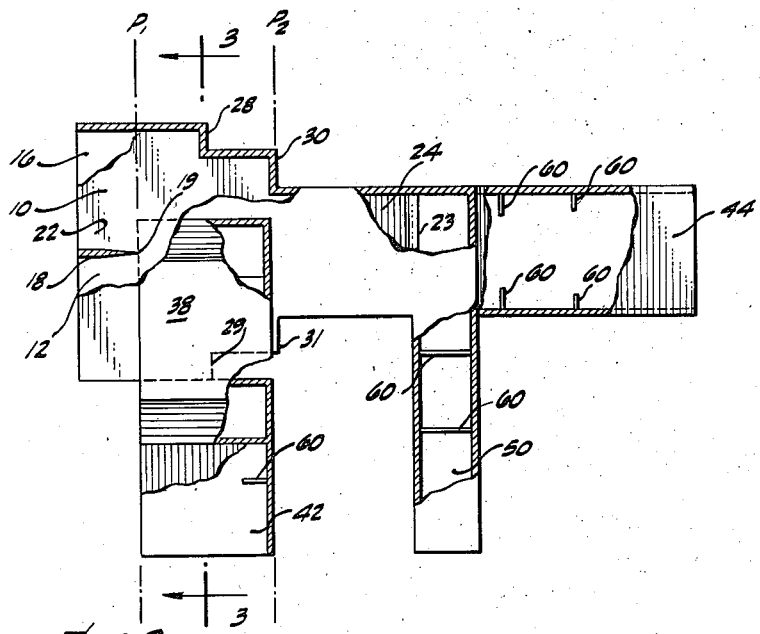
INVENTORS,
ALLAN W. HANSON,
DONALD E. KREINHEDER
BY Harvey S. Lombard
AGENT.

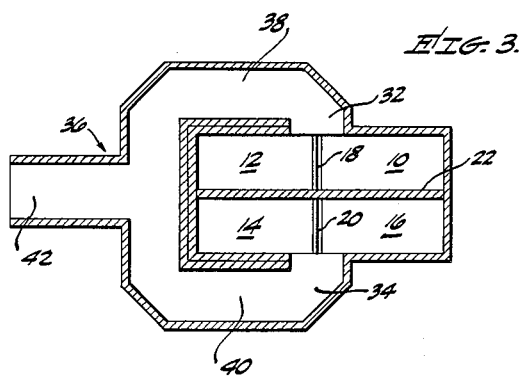
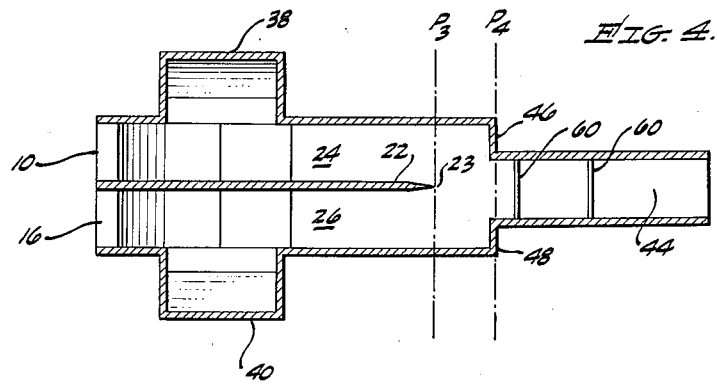

United States Patent Office 2,973,487
Patented Feb. 28, 1961

2,973,487
WAVEGUIDE HYBRID STRUCTURE

Allan W. Hanson and Donald E. Kreinheder, Los Angeles, Calif., assignors to Hughes Aircraft Company, Culver City, Calif., a corporation of Delaware Filed June 3, 1957, Ser. No. 664,877

9 Claims. (Cl. 333—11)

This invention relates to microwave hybrid structures and, more particularly, to a hybrid structure suitable particularly for use with a simultaneous lobing antenna.

Simultaneous lobing microwave tracking systems of the prior art utilize a single microwave beam for illuminating a target which, upon reflection, provides an echo signal from which the desired position information of the target may be obtained. The antenna portion of such a tracking system, usually designated as a simultaneous lobing antenna, includes four symmetrically spaced radiator elements to effect the transfer of microwave energy between the system and space, and a hybrid structure to intermix the signals developed by the radiator elements in a predetermined fashion. This invention relates particularly to such a hybrid structure.

The operation of a simultaneous lobing tracking system is as follows: For illuminating the target, the four radiator elements are excited equally by a transmitter coupled to the radiator elements through the hybrid structure. The hybrid structure channels equal amounts of wave energy to each radiating element to provide the illuminating beam so that it operates as a dividing network during the illuminating and transmitting cycle. During the receiving cycle, the echo signal from the target excites the four radiatior elements to provide information of the target location. The four signals developed by the four radiator elements upon reception are vectorially added and vectorially subtracted by the hybrid structure in accordance with a well known scheme to develop three simultaneous lobing antenna output signals which are applied to the receiver or receivers of the tracking system. The three simultaneous lobing antenna output signals may be conventionally designated respectively as the sum signal, the azimuth signal and the elevation signal.

The relative amplitudes and phases of the waves excited in the radiators by the echo signal are proportional to the angular position of the target in a plane perpendicular to the axis of symmetry of the four radiator elements. By comparing the relative amplitudes and phases of the signals developed by the four radiators with one another as is done by the hybrid structure in deriving the output signals, the angular position of the target in terms of rectangular coordinates is obtained.

A hybrid structure of the prior art for deriving the sum, azimuth and elevation signal from the signals excited in the radiators consists of four individual magic tees coupled to one another by auxiliary waveguides. Such an arrangement requires a considerable amount of space in an otherwise desirable simultaneous lobing antenna and adds weight thereto. Furthermore, the interconnecting waveguides coupling the four hybrid junctions to one another to provide the hybrid structure of the prior art result in great complexity and increase the path lengths between the radiator elements and the receiver.

It is therefore an object of this invention to provide a simplified hybrid structure capable of exciting four radiator elements equally for illuminating a target and deriving the sum, the azimuth and the elevation signal from the radiator elements upon receiving a signal from the target.

It is a further object of this invention to provide a novel seven terminal hybrid junction for use with a simultaneous lobing antenna which requires considerably less space and less weight than has heretofore been possible with prior art hybrid structures wherein four conventional hybrid junctions were combined.

It is a still further object of this invention to provide a simplified hybrid structure for coupling four radiator elements to a transceiver to devise a simultaneous lobing tracking system, which hybrid structure is a single integrated waveguide component.

In accordance with the present invention, there is provided a hybrid structure having four input terminals and three output terminals. Four microwave signals are respectively excited within said four input terminals and combined by the hybrid structure in pairs so that each pair provides one signal equal to the sum and one signal equal to the difference of the microwave signals. The two signals which are equal to the difference of the microwave signal pairs are further subtracted from one another to provide an azimuth output signal. The two signals which are equal to the sum of the microwave signal pairs are further subtracted from one another to provide an elevation output signal, and are also added to one another to provide a sum output signal.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 1 is a perspective view of the hybrid structure in accordance with this invention;

Fig. 2 is a plan view, parts broken away, of the hybrid structure of Fig. 1; and Figs. 3 and 4 are sectional views taken respectively along line 3—3 of Fig. 2 and line 4—4 of Fig. 1.

Referring now to the drawings wherein like reference characters designate like parts, a first waveguide 10, a second waveguide 12, a third waveguide 14 and a fourth waveguide 16, each one being of rectangular cross section and adapted to be excited in the $TE_{01}$-mode, provide respectively a first, second, third and fourth input terminal to the hybrid structure of this invention. Waveguides 10 and 12 have a common narrow wall 18 and form a first pair of waveguides. Similarly, waveguides 14 and 16 have a common narrow wall 20 and form a second pair of waveguides. The first pair of waveguides and the second pair of waveguides have a broad common wall 22. Fig. 3 is a sectional view of the input portion of the waveguide structure and shows the spacial arrangement of the waveguides 10, 12, 14 and 16 most clearly.

The common narrow walls 18 and 20 each have a terminating edge 19 (see Fig. 2) which lies in a first plane $P_1$. The plane $P_1$ is perpendicular to the longitudinal direction of the first and second waveguide pairs and is indicated by a broken line. The terminating edge 19 may be sharp as shown in Fig. 2 but is not limited to this shape. In fact, the terminating edge 19 may be blunt, round or flat. Its shape is preferably chosen to provide a good impedance match between the portion of the hybrid structure lying to the left and the right of the plane $P_1$.

The width of the first waveguide pair comprising the waveguides 10 and 12 and lying to the right of the terminating edge 19 of the common narrow wall 18 progressively narrows until its width is reduced to that of a single waveguide. Waveguide 24 is the extension of the first pair of waveguides. Similarly, the width of the second pair of waveguides comprising the waveguides 14 and 16 is progressively reduced to that of a single waveguide. Waveguide 26 is the extension of the second pair of waveguides.

Waveguides 24 and 26 commence to the right of a second plane designated as $P_2$ parallel to the first plane $P_1$. Consequently, the transition between the first pair of waveguides 10, 12, and waveguide 24 starts at the first plane $P_1$ and ends at the second plane $P_2$ so that the transition is confined to the space lying between the two planes $P_1$ and $P_2$. This transition may be accomplished by the two steps 28 and 30 as shown particularly in Figs. 1 and 2 or any of the other transitions such as a tapered transition as is well known to those skilled in the art. The transition between planes $P_1$ and $P_2$ should provide a good impedance match between the first pair of waveguides 10, 12, and the waveguide 24. What has been said hereabove with respect to the transition from the first pair of waveguides to the waveguide 24 is likewise applicable to the transition from the second pair of waveguides to the waveguide 26. In the preferred embodiment of this invention, the transitions are identical.

Waveguide 32 (Fig. 3) is a short waveguide section coupled to the waveguide transition extending from the first pair of waveguides into waveguide 24. The broad walls of waveguide 32 are lying in two planes which are substantially equidistant from and parallel to the narrow common wall 18. Both of the narrow walls of the waveguide 32 generally may lie within the space defined by the first and second plane $P_1$ and $P_2$ to provide good electromagnetic coupling to waveguides 10 and 12. In other words, the first pair of waveguides, the waveguide 24 and the waveguide 32 provide, in combination, a hybrid junction. Waveguide 34 is another short waveguide section which is coupled to the transition connecting the second pair of waveguides to waveguide 26 in the manner described in conjunction with waveguide 24. In fact, a preferred arrangement is one wherein complete symmetry is maintained so that waveguides 32 and 34 are colinear. The method of coupling waveguides 32 and 34 to the transitions may be one of the many known to those skilled in the art. A preferred embodiment however, as shown in Fig. 3, is an open coupling which has the advantage of a low voltage standing wave ratio.

An E-plane T-junction 36 having symmetry branch arms 38 and 40 and an output branch arm 42 is coupled to the waveguides 32 and 34 as shown in detail in Fig. 3. The longitudinal configuration of the symmetry branch arms 38 and 40 does not necessarily have to assume the form there shown. It is only essential that an equal length of waveguide path is maintained from the first pair of waveguides and the second pair of waveguides to the output terminal 42. Although the symmetry branch arms 38 and 40 are described as being coupled respectively to the waveguides 32 and 34, it should be obvious from the drawings that one is merely an extension of the other and the assignment of different reference characters thereto is merely to aid the explanation of this invention. It may be said that the symmetry arms 38 and 40 of an E-plane T-junction are coupled respectively to the first and second waveguide pair.

As described above, waveguides 24 and 26, each being an extension of one of the first and second pairs of waveguides are separated by a common broad wall 22 (see Fig. 4). These two waveguides 24 and 26 may be designated as a third pair of waveguides.

The common broad wall 22 terminates in a terminating edge 23 lying in a plane $P_3$ as shown in greater detail in Fig. 4. The third plane $P_3$ is substantially parallel to the first plane $P_1$ and likewise defines the beginning of a transition section. The narrow walls of the third pair of waveguides are progressively reduced to a single waveguide 44. In fact, waveguide 44 is the extension of the third pair of waveguides and commences to the right of a fourth plane $P_4$ parallel to the first plane $P_1$. The transition from the third pair of waveguides to waveguide 44 is confined to the space lying between the planes $P_3$ and $P_4$. What has been said in connection with the transitions lying between the first and second plane $P_1$ and $P_2$ applies here also. A step transition 46 and 48 may be utilized as shown in Fig. 4, or other transitions may be substituted as is well known to those skilled in the art.

Waveguide 50 is coupled to the third pair of waveguides at a point lying between the third plane $P_3$ and the fourth plane $P_4$ as shown in detail in Figs. 1 and 2. The narrow walls of waveguide 50 are lying in the planes of the broad walls of the third pair of waveguides, its direction of elongation being perpendicular thereto. The coupling between the third pair of waveguides and waveguide 50 may be an open coupling as shown in the preferred embodiment illustrated by the drawings or any other coupling such as a slot or a dipole.

To provide an impedance match between the branch arms of the above described hybrid structure, it has been found desirable to add a matching structure such as conventional matching irises to several of the branch arms. Such matching irises are indicated by reference character 60 throughout and present essentially a refinement of the invention. The exact number, location and size of the irises is a matter for experimental determination as is well known to those skilled in the art. The drawings show one or more irises 60 disposed within waveguides 42, 44, and 50.

Referring now to the operation of the hybrid structure of this invention, there are two phases to be considered, namely a microwave transmission from a transmitter to the radiation elements to illuminate the target, and a microwave transmission from the radiation elements to the various receivers. As a practical matter, waveguide 44 is directly coupled to a transceiver and waveguides 10, 12, 14 and 16 are coupled to radiation elements. Neither the transceiver nor the radiation elements are shown in the drawings since they are not part of this invention and are used merely by way of example to describe the operation of the hybrid structure of this invention.

During the transmitting phase, the waveguide 44 is excited in the fundamental mode by a transmitter. This wave energy is equally divided between waveguides 24 and 26 by the transition between waveguide 44 and the third waveguide pair. Waveguide 50 is not excited since there is no electromagnetic coupling between waveguides 44 and 50. Wave energy propagated by the third pair of waveguides is once more equally subdivided by the transitions which respectively couple waveguide 24 to the first pair of waveguides and waveguide 26 to the second pair of waveguides. Consequently, the wave energy excited within waveguide 44 is transmitted through the hybrid structure and equally excites the four waveguides 10, 12, 14 and 16. Waveguides 32 and 34 are not excited since there is no electromagnetic coupling between waveguides 32 and 24 and waveguides 34 and 26.

During the receiving phase, waveguides 10, 12, 14 and 16 are each separately excited from a microwave signal received from the target. If the target is not located along an axis of symmetry of the system, the phase of excitation of the four waveguides will be unequal. This inequality of excitation provides the desired position information so well known to those skilled in the art. The signals excited within the four input waveguides may be designated as vector quantities since they have magnitude and phase. Let the signals excited within waveguides 10, 12, 14 and 16 be designated respectively as $\bar{A}$, $\bar{B}$, $\bar{C}$ and $\bar{D}$ as shown in Fig. 1.

The transition from the first pair of waveguides to waveguide 24 and to the orthogonally coupled waveguide 32 acts just like a hybrid junction so that a signal $$\vec{A}+\vec{B}$$

is excited within waveguide 24 and a signal $$\vec{A}-\vec{B}$$

is excited within waveguide 32. Similarly the signals $$\vec{C} \text{ and } \vec{D}$$

propagated by the second pair of waveguides excite a signal $$\vec{C}+\vec{D}$$

within waveguide 26 and a signal $$\vec{D}-\vec{C}$$

within waveguide 34. These signals are vector additions and vector subtractions and take into consideration the phase difference existing therebetween.

Waveguides 32 and 34 are coupled to the symmetry branch arms 38 and 40 of the T-junction 36. The property of this junction is to vectorially add the signals propagated towards the junction point by the symmetry branch arms. Consequently, the output waveguide 42 also referred to as the azimuth output terminal, is excited by signal $$\vec{A}-\vec{B}-\vec{C}+\vec{D}$$

the azimuth signal.

Waveguides 24 and 26 are coupled by the transition lying between plane $P_1$ and $P_2$ to waveguides 44 and 50. These four waveguides essentially provide another hybrid junction so that waveguide 44 is excited by a signal $$\vec{A}+\vec{B}+\vec{C}+\vec{D}$$

the sum signal, and waveguide 50 is excited by a signal $$\vec{A}+\vec{B}-\vec{C}-\vec{D}$$

the elevation signal. As is well known to those skilled in the art, the azimuth, elevation and sum signal hereabove defined provide complete information and the target position with respect to an axis of symmetry.

There has been described a new hybrid structure which has the property of dividing a microwave signal into four equal and in-phase signals along one direction of propagation and combining four microwave signals in a predetermined manner along the other direction of propagation. The hybrid structure may be used in conjunction with a simultaneous lobing antenna to derive the azimuth, elevation and sum signals which are indicative of the position of the target in space.

What is claimed as new is:

1. A seven terminal microwave hybrid structure adapted particularly for use with a simultaneous lobing antenna having four input terminals and three output terminals and comprising: a first, second, third and fourth rectangular waveguide, each having broad and narrow walls and providing said four input terminals, said first and second waveguide having a common narrow wall and defining a first pair of waveguides, said third and fourth waveguides having a common narrow wall and defining a second pair of waveguides, said common narrow walls terminating in a first plane extending at right angles to said narrow walls, the width of said first pair and said second pair of waveguides progressively narrowing to respectively define a fifth and a sixth rectangular waveguide commencing at a second plane parallel to said first plane; seventh and eighth rectangular waveguides centrally coupled to and extending perpendicularly from opposite broad wall portions lying between said first and said second plane of said first pair and said second pair of waveguides respectively and having narrow walls substantially parallel to said first plane; an E-plane, T-junction including two symmetry branch arms, and an output branch arm providing one of said output terminals, said symmetry branch arms being coupled respectively to said seventh and said eighth waveguide, said fifth and said sixth waveguide defining a third pair of waveguides having a common broad wall, said common broad wall terminating in a third plane parallel to said first plane, the height of said third pair of waveguides progressively narrowing to define a ninth rectangular waveguide commencing at a fourth plane parallel to said first plane, and providing a second one of said output terminals; and a tenth rectangular waveguide centrally coupled to and extending perpendicularly from one of the narrow wall portions lying between said third and fourth plane of said third pair of waveguides and having broad walls substantially parallel to said third plane, said tenth waveguide providing the third one of said output terminals.

2. A seven terminal microwave hybrid structure adapted particularly for use with a simultaneous lobing antenna having four input terminals and three output terminals and comprising: a first, second, third and fourth rectangular waveguide, each having broad and narrow walls and providing said four input terminals, said first and second waveguides having a common narrow wall and defining a first pair of waveguides, said third and fourth waveguides having a common narrow wall and defining a second pair of waveguides, said common narrow walls terminating in a first plane extending at right angles to said narrow walls, the width of said first pair and said second pair of waveguides progressively narrowing to respectively define a fifth and a sixth rectangular waveguide commencing at a second plane parallel to said first plane; seventh and eighth rectangular waveguides centrally coupled to and extending perpendicularly from opposite broad wall portions lying between said first and said second plane of said first pair and said second pair of waveguides respectively and having one of its narrow walls lying substantially within said second plane; an E-plane, T-junction including two symmetry branch arms and an output branch arm providing one of said output terminals, said symmetry branch arms being coupled respectively to said seventh and said eighth waveguide, said fifth and said sixth waveguide defining a third pair of waveguides having a common broad wall, said common broad wall terminating in a third plane parallel to said first plane, the height of said third pair of waveguides progressively narrowing to define a ninth rectangular waveguide commencing at a fourth plane parallel to said first plane, and providing a second one of said output terminals; and a tenth rectangular waveguide centrally coupled to and extending perpendicularly from one of the narrow wall portions lying between said third and fourth plane of said third pair of waveguides and having one of its broad walls disposed substantially within said fourth plane, said tenth waveguide providing the third one of said output terminals.

3. A seven terminal microwave hybrid structure adapted particularly for use with a simultaneous lobing antenna having four input terminals and three output terminals and comprising: a first, second, third and fourth rectangular waveguide, each having broad and narrow walls and providing said four input terminals, said first and second waveguide having a common narrow wall and defining a first pair of waveguides, said third and fourth waveguides having a common narrow wall and defining a second pair of waveguides, said common narrow walls terminating in a first plane extending at right angles to said narrow walls, the width of said first pair and said second pair of waveguides stepwise narrowing to respectively define a fifth and a sixth rectangular waveguide commencing at a second plane parallel to said first plane; seventh and eighth rectangular waveguides coupled to and extending perpendicularly from opposite broad walls of said first pair and said second pair of waveguides respectively and having narrow walls lying substantially within said first and said second plane; an E-plane T-junction including two symmetry branch arms, and an output branch arm providing one of said output terminals, said symmetry branch arms being coupled respectively to said seventh and said eighth waveguide, said fifth and said sixth waveguide defining a third pair of waveguides having a common broad wall, said common broad wall terminating in a third plane parallel to said first plane, the height of said third pair of waveguides stepwise narrowing to define a ninth rectangular waveguide commencing at a fourth plane parallel to said first plane and providing a second one of said output terminals; and a tenth rectangular waveguide coupled to and extending perpendicularly to one of the narrow walls of said third pair of waveguides and having broad walls disposed substantially within said third and said fourth plane, said tenth waveguide providing the third one of said output terminals.

4. A seven terminal microwave hybrid structure having four input terminals and three output terminals and comprising: a first, second, third and fourth rectangular waveguide, each having broad and narrow walls and providing said four input terminals, said first and second waveguides having a common narrow wall and defining a first pair of waveguides, said third and fourth waveguides having a common narrow wall and defining a second pair of waveguides, said common narrow walls terminating in a first plane extending at right angles to said narrow walls, the width of said first pair and said second pair of waveguides progressively narrowing to respectively define a fifth and a sixth rectangular waveguide commencing at a second plane parallel to said first plane and respectively providing a first and a second one of said output terminals; seventh and eighth rectangular waveguides centrally coupled to and extending perpendicularly from opposite broad wall portions lying between said first and said second plane of said first pair and said second pair of waveguides respectively and having narrow walls substantially parallel to said first plane; and an E-plane, T-junction including two symmetry branch arms, and an output branch arm providing the third of said output terminals, said symmetry branch arms being coupled respectively to said seventh and said eighth waveguide.

5. A seven terminal microwave hybrid structure having four input terminals and three output terminals and comprising: a first, second, third and fourth rectangular waveguide, each having broad and narrow walls and providing said four input terminals, said first and second waveguides having a common narrow wall and defining a first pair of waveguides, said third and fourth waveguides having a common narrow wall and defining a second pair of waveguides, each of said common narrow walls terminating in a first plane extending at right angles to said narrow walls, the width of said first pair and said second pair of waveguides stepwise narrowing to respectively define a fifth and a sixth rectangular waveguide commencing at a second plane parallel to said first plane and respectively providing the first and second one of said output terminals; seventh and eighth rectangular waveguides coupled to and extending perpendicularly from opposite broad walls of said first pair and said second pair of waveguides respectively and having narrow walls disposed substantially within said first and said second plane; and an E-plane, T-junction including two symmetry branch arms and an output branch arm providing the third one of said output terminals, said symmetry branch arms being coupled respectively to said seventh and said eighth waveguide.

6. A hybrid structure as defined in claim 1 wherein matching irises are provided within at least one of said output terminals.

7. A hybrid structure as defined in claim 5 wherein matching irises are provided within at least one of said output terminals.

8. A seven terminal microwave hybrid structure having four input terminals and three output terminals and comprising: a first, second, third and fourth rectangular waveguide adapted to be excited by a first, second, third and fourth signal respectively, each having broad and narrow walls and providing said four input terminals, said first and second waveguides defining a first pair of waveguides, said third and fourth waveguides defining a second pair of waveguides, the width of said first pair and said second pair of waveguides progressively narrowing to respectively define a fifth and sixth rectangular waveguide adapted to be excited respectively by the vector sum of said first and second signal and said third and fourth signal; seventh and eighth rectangular waveguides coupled to and extending perpendicularly from opposite broad walls of said first pair and said second pair of waveguides respectively and adapted to be excited respectively by the vector difference between said first and second signal and said third and fourth signal; an E-plane, T-junction including two symmetry branch arms and an output branch arm providing one of said output terminals coupled to said seventh and eighth waveguide, said output branch arm being adapted to be excited by the vector sum of the two vector differences of said first and second signal and said third and fourth signal, said fifth and sixth waveguide defining a third pair of waveguides, the height of said third pair of waveguides progressively narrowing to define a ninth rectangular waveguide adapted to be excited by the vector sum of said first and second signal and said third and fourth signal and providing a second one of said output terminals; and a tenth rectangular waveguide coupled to and extending perpendicularly from one of the narrow wall portions of said third pair of waveguides and adapted to be excited by the vector difference of the vector sum of said first and second signal and said third and fourth signal and providing the third one of said output terminals.

9. A seven terminal microwave hybrid structure having four input terminals and three output terminals and comprising: a first, second, third and fourth rectangular waveguide adapted to be excited by a first, second, third and fourth signal respectively, each having broad and narrow walls and providing said four input terminals, said first and second waveguide having a common narrow wall and defining a first pair of waveguides, said third and fourth waveguides having a common narrow wall and defining a second pair of waveguides, said common narrow walls terminating in a predetermined plane and the width of said first pair and said second pair of waveguides progressively narrowing to respectively define a fifth and sixth rectangular waveguide adapted to be excited respectively by the vector sum of said first and second signal and said third and fourth signal; seventh and eighth rectangular waveguides coupled to and extending perpendicularly from opposite broad walls of said first pair and said second pair of waveguides respectively and adapted to be excited respectively by the vector difference between said first and second signal and said third and fourth signal; an E-plane, T-junction including two symmetry branch arms and an output branch arm providing one of said output terminals coupled to said seventh and eighth waveguide, said output branch arm being adapted to be excited by the vector sum of the two vector differences of said first and second signal and said third and fourth signal, said fifth and said sixth waveguide defining a third pair of waveguides having a common broad wall, said common broad wall terminating in a predetermined plane and the height of said third pair of waveguides progressively narrowing to define a ninth rectangular waveguide adapted to be excited by the vector sum of said first and second signal and said third and fourth signal and providing a second one of said output terminals; and a tenth rectangular waveguide coupled to and extending perpendicularly from one of the narrow wall portions of said third pair of waveguides and adapted to be excited by the vector difference of the vector sum of said first and second signal and said third and fourth signal and providing the third one of said output terminals.

References Cited in the file of this patent

UNITED STATES PATENTS

| | | |
|---|---|---|
| 2,818,549 | Adcock et al. | Dec. 31, 1947 |
| 2,764,740 | Pratt | Sept. 25, 1956 |